United States Patent
Fukuda

(10) Patent No.: US 9,036,873 B2
(45) Date of Patent: May 19, 2015

(54) APPARATUS, METHOD, AND PROGRAM FOR DETECTING OBJECT FROM IMAGE

(75) Inventor: Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 13/528,094

(22) Filed: Jun. 20, 2012

(65) Prior Publication Data

US 2012/0328155 A1 Dec. 27, 2012

(30) Foreign Application Priority Data

Jun. 23, 2011 (JP) ................... 2011-139687

(51) Int. Cl.
- G06K 9/00 (2006.01)
- G06K 9/34 (2006.01)
- G06K 9/54 (2006.01)
- G06K 9/62 (2006.01)

(52) U.S. Cl.
CPC .................... *G06K 9/6257* (2013.01)

(58) Field of Classification Search
CPC .. G06K 9/00221; G06K 9/628; G06F 12/023; G06T 2207/20016; H04N 1/3935
USPC .......................... 382/118, 227, 305
See application file for complete search history.

(56) References Cited

U.S. PATENT DOCUMENTS

| | | | | |
|---|---|---|---|---|
| 6,424,385 B1* | 7/2002 | Koyama et al. | ................ | 348/734 |
| 6,535,246 B2* | 3/2003 | Kindaichi | ................ | 348/231.99 |
| 6,836,273 B1* | 12/2004 | Kadono | .................. | 345/543 |
| 7,315,259 B2* | 1/2008 | Sacks | .......................... | 340/995.1 |
| 7,904,836 B2* | 3/2011 | Yoshikawa et al. | ........... | 715/860 |
| 7,974,441 B2* | 7/2011 | Yamada et al. | ................ | 382/103 |
| 8,144,367 B2* | 3/2012 | Yamada | ...................... | 358/3.24 |
| 8,472,711 B2* | 6/2013 | Hasegawa | ..................... | 382/167 |
| 8,644,687 B2* | 2/2014 | Kitagawa et al. | ............. | 386/294 |
| 2002/0056096 A1* | 5/2002 | Mori et al. | ...................... | 725/38 |
| 2006/0039609 A1* | 2/2006 | Takano | ......................... | 382/190 |
| 2007/0121161 A1* | 5/2007 | Yamada | ....................... | 358/1.16 |
| 2011/0019007 A1* | 1/2011 | Elazar et al. | ................ | 348/207.1 |
| 2011/0025858 A1* | 2/2011 | Elazar et al. | ................ | 348/207.1 |

OTHER PUBLICATIONS

Hidai, K.; Mizoguchi, H.; Hiraoka, K.; Tanaka, M.; Shigehara, T.; Mishima, T., "Robust face detection against brightness fluctuation and size variation," Intelligent Robots and Systems, 2000. (IROS 2000). Proceedings. 2000 IEEE/RSJ International Conference on , vol. 2, no., pp. 1379,1384 vol. 2, 2000.*

"Detecting Faces in Images: A Survey" written by M. H. Yang, D. J. Kriegman, and N. Ahuja, published in Institute of Electrical and Electronics Engineers (IEEE) Transactions on Pattern Analysis and Machine Intelligence (Trans. on PAMI), vol. 24, No. 1, pp. 34 to 58, issued in Jan. 2002.

* cited by examiner

*Primary Examiner* — Utpal Shah

(74) *Attorney, Agent, or Firm* — Canon U.S.A., Inc. IP Division

(57) ABSTRACT

An image processing apparatus includes a detection unit configured to scan an input image and each of images at different resolutions, which are generated from the input image, by a predetermined-sized window to detect an object in the image, a storage unit configured to store a detection result of the detection unit, and a control unit configured to, if there is no free space in the storage unit to store a new detection result of the detection unit, store the new detection result instead of a detection result of an image at higher resolution than resolution of an image from which the new detection result is acquired.

8 Claims, 18 Drawing Sheets

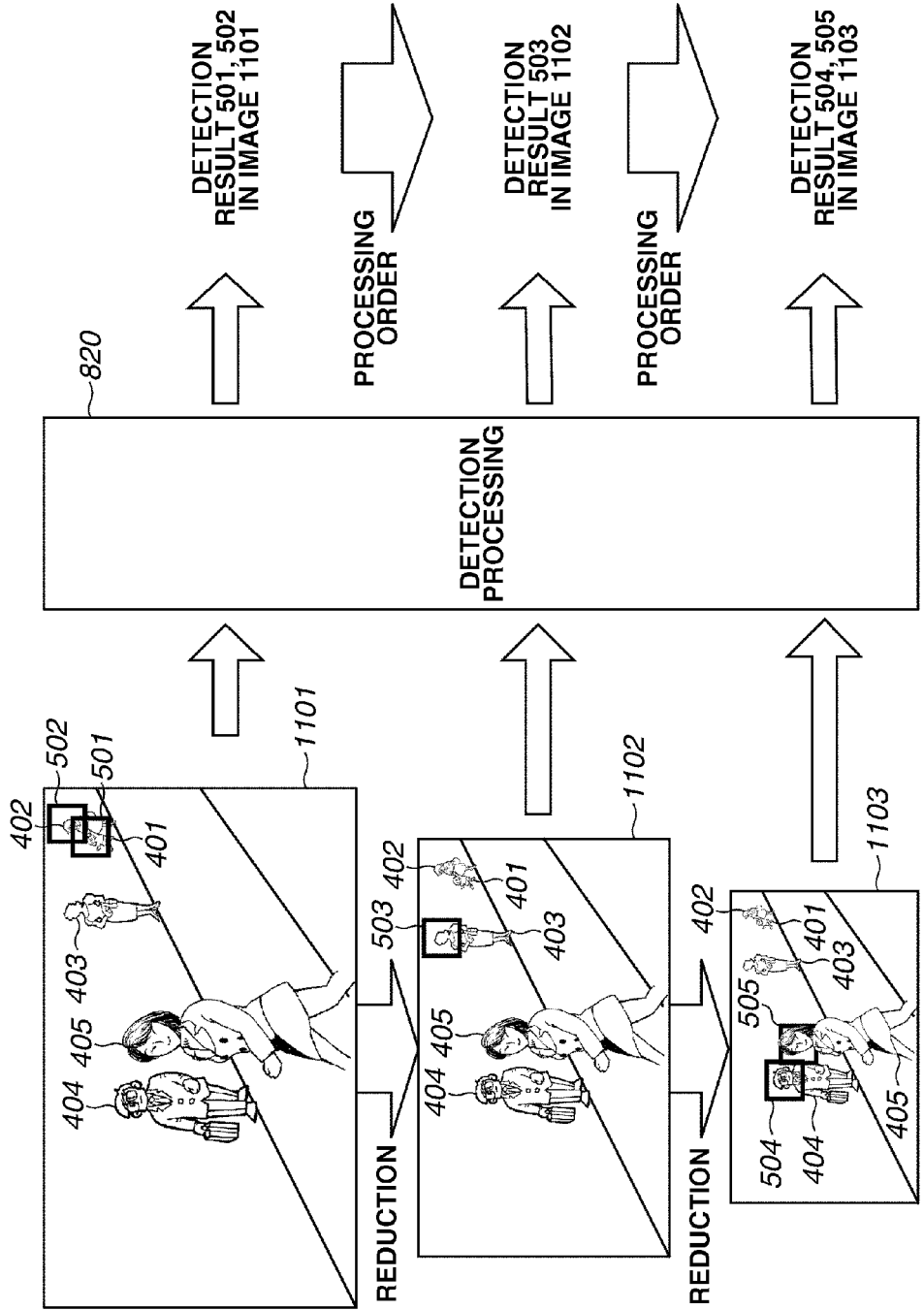

APPARATUS, METHOD, AND PROGRAM FOR DETECTING OBJECT FROM IMAGE

BACKGROUND OF THE INVENTION

1. Field of the Invention

The present invention relates to an apparatus, a method, and a program for detecting an object from an image.

2. Description of the Related Art

A technique for detecting a specific object pattern from an image is extremely useful and can be used for detection of a human face, for example. This technique can be used in many fields such as teleconferences, man-machine interfaces, security, monitoring systems for tracking a human face, and image compression. Various methods to realize this technique for detecting a face in an image are mentioned in "Detecting Faces in Images: A Survey" written by M. H. Yang, D. J. Kriegman, and N. Ahuja, published in Institute of Electrical and Electronics Engineers (IEEE) Transactions on Pattern Analysis and Machine Intelligence (Trans. on PAMI), Volume 24, Number 1, Pages 34 to 58, issued in January, 2002.

Especially, a method based on the Boosting algorithm proposed by Viola et al., which is discussed in "Robust Real-time Object Detection" written by P. Viola and M. Jones, published in Proceedings of IEEE Workshop Statistical and Computational Theories of Vision (SCTV), issued in July, 2001, is widely utilized in the research of the face detection due to its excellent execution speed and high accuracy of detection rate. The method based on the Boosting algorithm proposed by Viola et al. can speed up the face detection by connecting substantially identical small classification units (weak classifiers) in series and stopping detection processing when it is determined that the target region is not a face region in the middle of the detection processing to omit subsequent detection processing.

The size of a window image, which is a partial image referred to by the weak classifiers, is determined relative to a detection target having a certain presumed size. However, the size of a detection target in an actual image may continuously vary (for example, the size of the detection target continuously varies when a digital camera captures images of the object while changing a distance therebetween). Therefore, it is desirable to design an actual classifier (make a classifier learn) so as to be capable of accepting a change in the size of a detection target to some degree. However, for designing a classifier so as to be able to accept a change in the size, it is extremely difficult to realize a classifier that can detect a target even when, for example, a detection window contains only a part of the detection target because the detection target is extremely large. Similarly, it is also extremely difficult to realize a classifier that can detect a target when the detection target is extremely small relative to a detection window.

To solve this problem, there are two possible approaches. One approach is to increase the window size (also enlarge, for example, the reference area of the weak classifiers accordingly). The other approach is to, while fixing the window size, change (especially, reduce) the magnification ratio of an input image and set equally-sized windows to the several kinds of generated images with their magnification ratios changed (reduced) to detect a target by the classifier. In either method, it is difficult to continuously enlarge the window or reduce the image, so that it is desirable that the classifier can accept a change in the size to some degree after all. Further, similarly, it is also desirable that the classifier can accept changes in the position and the shape to some degree.

However, the classifier capable of accepting changes in the size and the position tends to provide a plurality of detection determinations around actually one detection target. This is because the position of the target may horizontally or vertically move in the image or the size may be different as described above (due to the change in the window size or the reduction of the image size). Therefore, integration processing, which integrates the plurality of detection results to output one detection result for one detection target, is necessary. The integration processing is a kind of clustering processing for clustering detection results distributed in a space in which the axes represent the horizontal and vertical positions and the size. Alternatively, the integration processing may be performed by using a space additionally having, for example, an axis representing reliability (likelihood) of a detection result. Since the integration processing is necessary, it is considered that each of the above-described detection results by the classifiers is an intermediate result, and it is desirable to configure a system which can store these intermediate results once and then perform the integration processing thereon.

As described above, it is necessary to once store the detection results of the classifiers, which are intermediate results, but an issue here is to estimate how large storage area to be prepared therefor. However, how many detection results are actually output from an image that is a detection target cannot be determined before actual execution of the detection processing. A theoretical upper limit value is the number (N) of windows settable in that image, but in many cases, the number of detection results from actual detection applied to an image is approximately 1 to 2% of N. Therefore, it is inefficient to prepare a large storage area capable of storing detection results corresponding to the theoretical upper limit value.

The size of the storage area may be not an important matter when the detection processing is realized by, for example, software running on a personal computer (PC), since a relatively high-capacity memory can be prepared in this case. However, in a case where detection processing is realized on software or hardware embedded in a device, it is desirable to realize the detection processing with use of a predetermined (fixed) small storage capacity. However, performing the detection processing using the predetermined small storage capacity may result in a shortage of the storage area exceptionally depending on the content of an image. In this case, data overflowing the storage capacity, among all detection results, should be discarded, but this leads to a problem of determining which and how detection result should be discarded.

SUMMARY OF THE INVENTION

The present invention is directed to realizing object detection processing with a small storage capacity.

According to an aspect of the present invention, an image processing apparatus includes a detection unit configured to scan an input image and each of images at different resolutions, which are generated from the input image, by a predetermined-sized window to detect an object in the image, a storage unit configured to store a detection result of the detection unit, and a control unit configured to, if there is no free space in the storage unit to store a new detection result of the detection unit, store the new detection result instead of a detection result of an image at higher resolution than resolution of an image from which the new detection result is acquired.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates processing applied to the image illustrated in FIG. 8.

DESCRIPTION OF THE EMBODIMENTS

Various exemplary embodiments, features, and aspects of the invention will be described in detail below with reference to the drawings.

Figure 1:
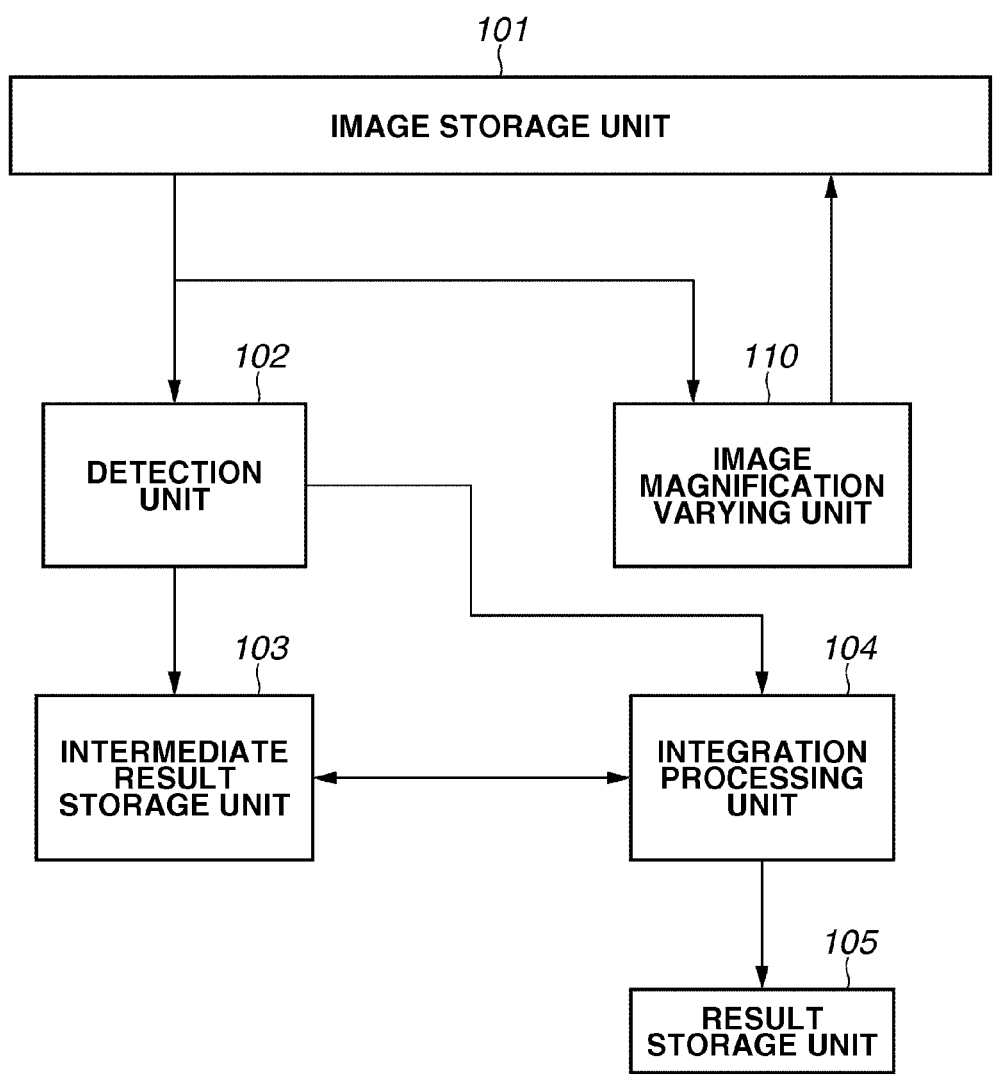
FIG. 1 illustrates an example of a hardware configuration of an image processing apparatus according to a first exemplary embodiment of the present invention.

FIG. 1 illustrates an example of a hardware configuration of an image processing apparatus according to a first exemplary embodiment. An image storage unit 101 stores image data which is a processing target. The image storage unit 101 is constituted by, for example, a memory. Alternatively, the image storage unit 101 may be constituted by, for example, a resister or a disk apparatus. A detection unit 102 performs detection processing. An example of the detection processing will be described below with reference to FIG. 2. The detection unit 102 outputs a detection result to an intermediate result storage unit 103. Further, the detection unit 102 instructs an integration processing unit 104 to start integration processing, when the detection unit 102 detects completion of processing one image. The intermediate result storage unit 103 stores the output of the detection unit 102. The intermediate result storage unit 103 is constituted by, for example, a memory. Alternatively, the intermediate result storage unit 103 may be constituted by, for example, a resister or a disk apparatus.

The integration processing unit 104 integrates the intermediate results stored in the intermediate result storage unit 103, and outputs an integration result thereof to a result storage unit 105. The integration processing unit 104 operates according to the instruction of the detection unit 102. The result storage unit 105 stores the output of the integration processing unit 104. The result storage unit 105 is constituted by, for example, a memory. Alternatively, the result storage unit 105 may be constituted by, for example, a resister or a disk apparatus. An image magnification varying unit 110 changes (at least reduces) a magnification ratio of an image stored in the image storage unit 101, and outputs the image with its magnification ratio changed. As illustrated in FIG. 1, the detection unit 102 is configured to be able to read the image with its magnification ratio changed. The image magnification varying unit 110 is also configured to output the image with its magnification ratio changed to the image storage unit 101. Besides these units, various other units may be added to the image processing unit of the present exemplary embodiment, but the description thereof will be omitted herein since they are not main features of the present exemplary embodiment.

Figure 2:
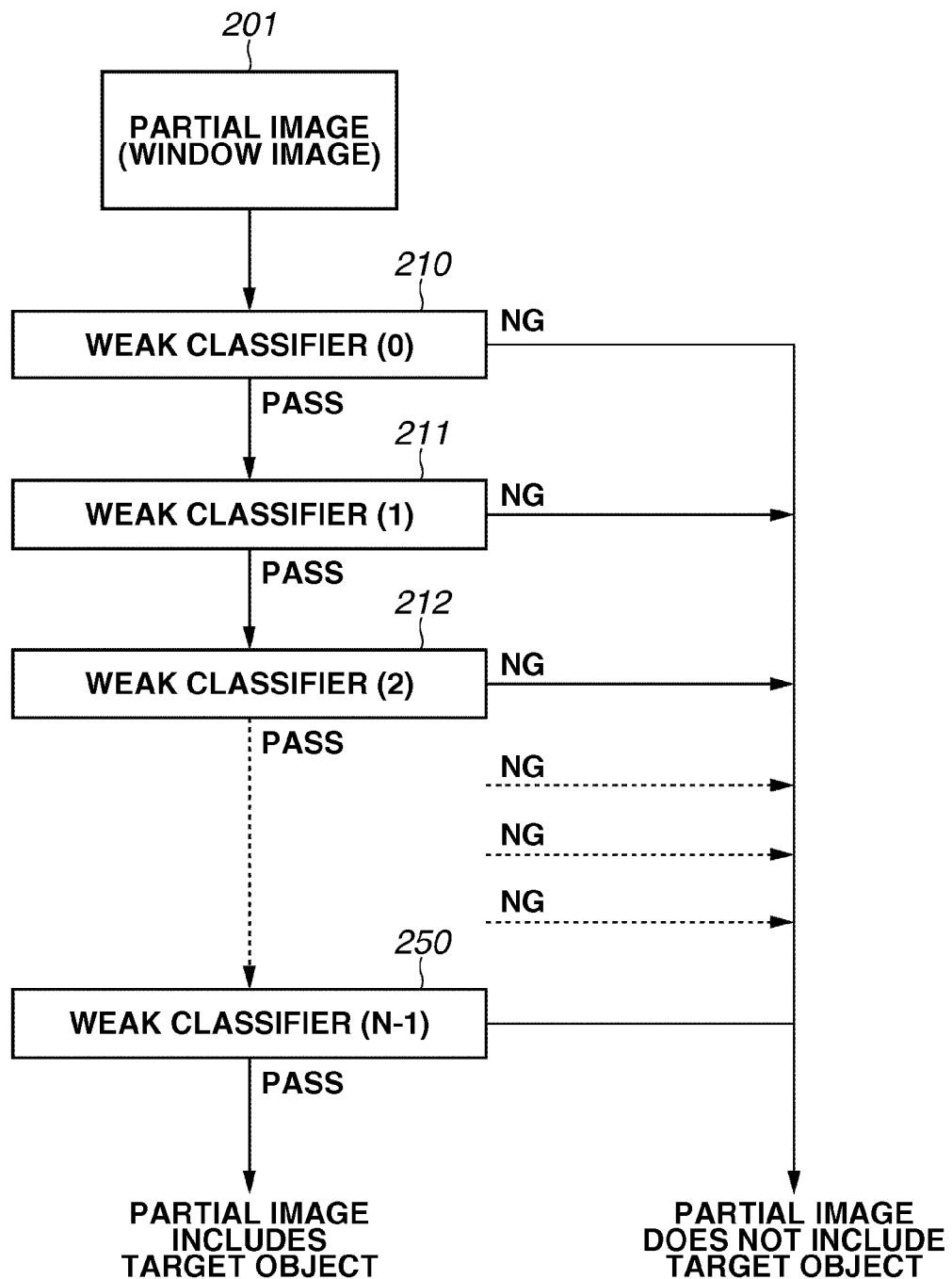
FIG. 2 illustrates an algorithm of face detection processing developed by applying the Boosting algorithm.

First, the detection processing by the detection unit 102 will be described. The present exemplary embodiment will be described based on an example in which a detection target is set to a human face. An example of the algorithm related to the detection processing will be described with reference to FIG. 2. The face detection processing developed by applying the Boosting algorithm will be described by way of example. FIG. 2 illustrates the algorithm of the face detection processing developed by applying the Boosting algorithm.

A partial image 201 is a partial region of input image data. The partial image 201 is an image within a predetermined window set on the input image data, and includes an image region referred to by weak classifiers 210 to 250, which will be described below. Hereinafter, the partial image 201 will be also referred to as a "window image". The weak classifier 210 refers to a part or all of pixel values in the window image 201, performs predetermined calculation on the pixel values, and determines whether the window image 201 contains an object as a detection target (in the present example, a human face region), from the calculation result. Parameters such as a reference position and range of the predetermined window image 201 and a coefficient used in the calculation are determined by machine learning prior to the actual detection processing.

The weak classifiers 211 to 250 also perform the calculation processing similar to the weak classifier 210. However, it is desirable that the weak classifiers 211 to 250 are configured in such a manner that the parameters such as the reference position and range of the window image 201 and the coefficient used in the calculation are different from those of the weak classifier 210. The weak classifiers 211 to 250 can be configured in such a manner that the parameters such as the reference position and range of the window image 201 and the coefficient used in the calculation are different from one another. In other words, the weak classifiers 210 to 250 perform substantially identical processes, except for the differences in the parameters such as the reference position and range of the window image 201 and the coefficient used in the calculation. Therefore, if the reference position and range of the window image 201, the coefficient, and the like used in the calculation are separated as parameters of the processing, the weak classifiers 210 to 250 can be considered as identical processes using different parameters.

It is assumed that N represents the number of the weak classifiers including the weak classifiers 210 to 250. Each of N pieces of the weak classifiers determines PASS or NG according to the internal calculation result, and these weak classifier processes are connected in series as illustrated in FIG. 2 to construct determination processing. The processing is started from the 0-th weak classifier 210. If the determination result by the 0-th weak classifier 210 is PASS, the determination processing proceeds to the next weak classifier 211. The processing is performed in this way. If the final weak classifier, namely the weak classifier 250 also determines PASS as the determination result, the detection unit 102 determines that the window image 201 contains the object (face) which is the detection target. On the other hand, if any weak classifier determines NG during the processing, the detection unit 102 cancels the subsequent processes, and determines that the window image 201 does not contain the object (face), which is the detection target. In this way, N pieces of the weak classifiers of the weak classifiers 210 to 250 are combined to construct a robust classifier as a whole.

Figure 3:
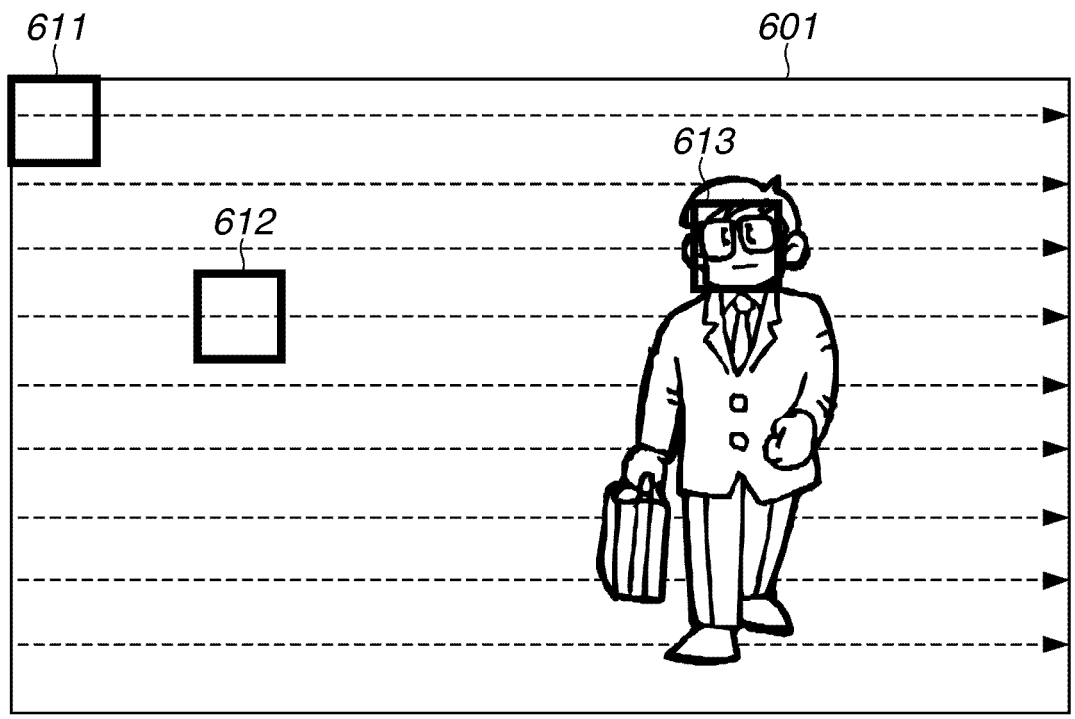
FIG. 3 illustrates processing for detecting a target by applying a detection window to an image.

Next, the flow of the overall processing will be described. FIG. 3 illustrates processing of detecting an object by applying a detection window to an image. A detection window 611 is applied to image data (hereinafter also referred to as just "image") 601. The detection window 611 is the same as the window image 201 illustrated in FIG. 2. During the detection processing, the detection unit 102 applies the detection algorithm illustrated in FIG. 2 to each position while moving the window 611 in the image 601 so as to partially overlap another window. Windows 612 and 613 illustrated in FIG. 3 are examples of the moved window. Especially, the window 613 is an example of a window located on the position of a face which is the detection target.

The detection algorithm illustrated in FIG. 2 needs to have a high generalization property. This is because an image that is a detection target during the execution of the processing, especially, a detection target or an object cannot be viewed in advance, and therefore the algorithm has to process an unknown image pattern. Therefore, the detection algorithm is designed so as to be able to detect a detection target (face) even if a change occurs to some degree in the size, position, and shape relative to the detection window. However, it is extremely difficult to design the detection algorithm so as to be able to detect even an object significantly different from the size, position, and shape of the target expected by the algorithm.

Figure 4:
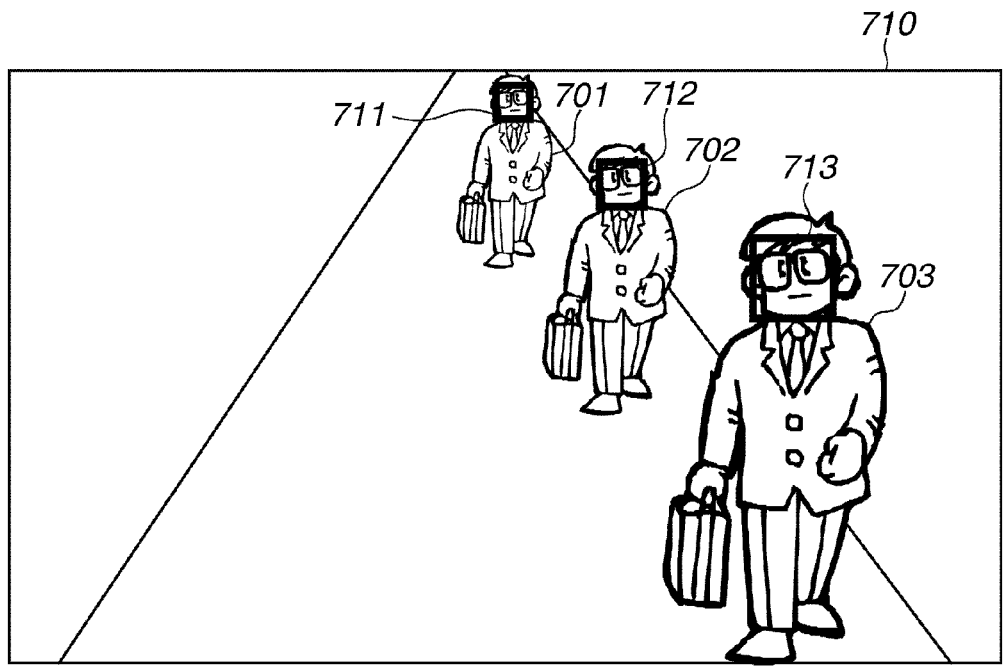
FIG. 4 illustrates states in which a size of a face as a detection target varies.

FIG. 4 illustrates states in which a size of a face as the detection target varies. In an image 710, objects 701 to 703 are a person in different sizes in the image. In the image 710, the object 701 is small in size because the object 701 is positioned away from an imaging position. On the contrary, the object 703 is large in size because the object 703 is positioned relatively near to the imaging position. Further, rectangles 711 to 713 are rectangles roughly surrounding the respective face regions of the objects 701 to 703, and the sizes thereof are different. Therefore, a method illustrated in FIG. 5 is employed as a method for respectively detecting detection targets in various sizes depending on, for example, how they are imaged in this way.

Figure 5:
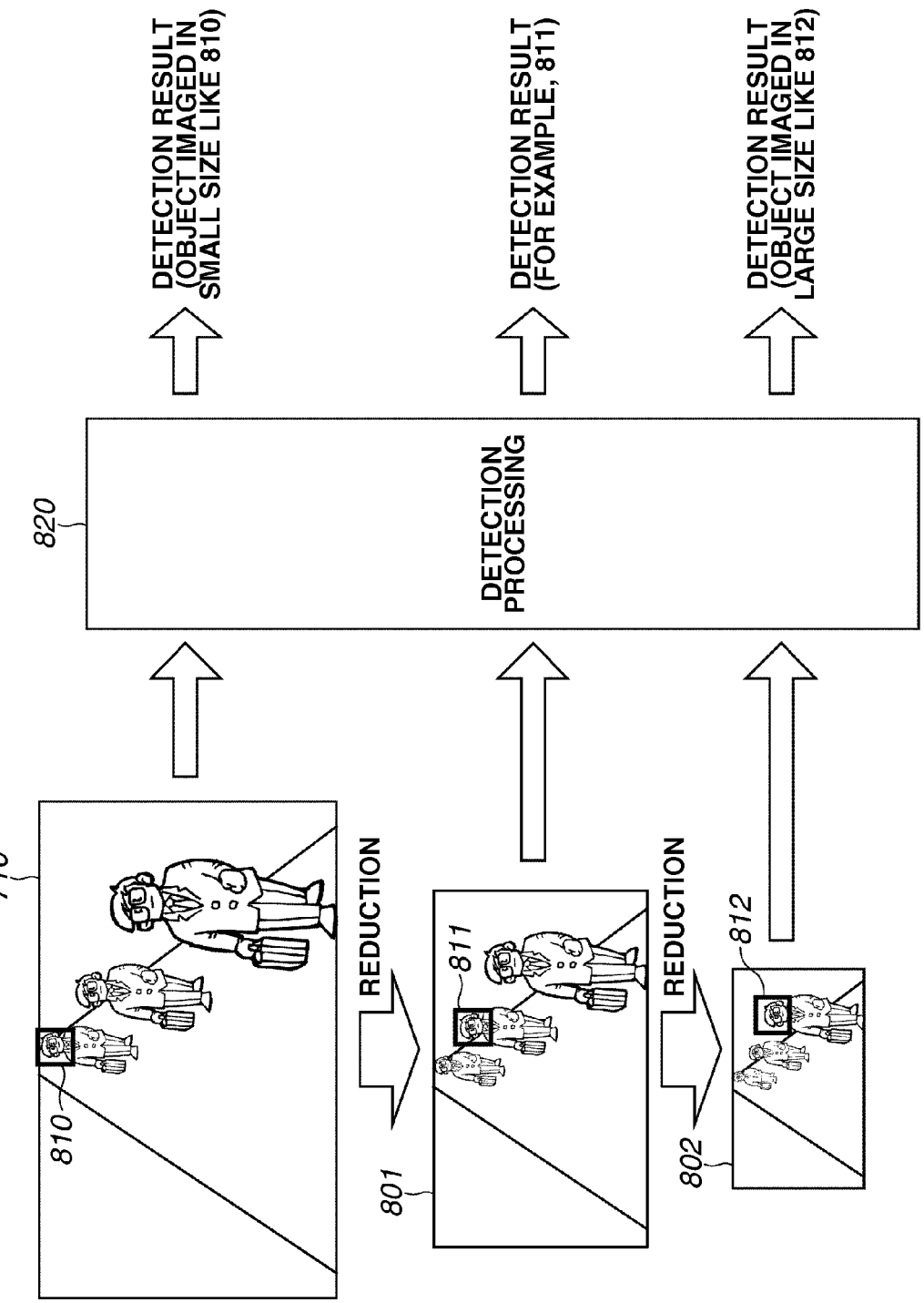
FIG. 5 illustrates a processing procedure of detection processing.

FIG. 5 illustrates a processing procedure of the detection processing. The image 710 is the same as the image illustrated in FIG. 4, and is a detection target image input to the system. The detection unit 102 applies detection processing 820 (the algorithm illustrated in FIG. 2) thereto. The image magnification varying unit 110 outputs reduced images 801 and 802 by reducing the image 710. The detection unit 102 performs detection by applying the detection processing 820 to these reduced images 801 and 802 as well.

Detection windows 810 to 812 in the respective images are the same in size. However, the image resolution of the processing target is different among them, and the detection window 810 matches a face in a relatively small size. On the contrary, the detection window 812 matches a face in a relatively large size. Further, the detection window 811 matches a face in an intermediate size between the detection window 810 and the detection window 812. In other words, in the image 710 at high resolution, the face in a small size is detected. In the image 802 at low resolution, the face in a large size is detected. In the image 801 at intermediate resolution, the face in an intermediate size is detected.

The method for reducing an image may be any known method. In addition, the magnification ratio at which the image is reduced may be determined in advance. In the present exemplary embodiment, the image magnification varying unit 110 generates the reduced image 801 from the image 710, and generates the reduced image 802 from the reduced image 801. In the case where such a method is used, actually, the image reduction cannot avoid being performed in a discrete manner to some degree (for example, the image is horizontally and vertically reduced by ½ or 1/√2). However, since the detection algorithm has the high generalization property as described above, the detection target can be detected if the face in each image has a somewhat different size from the size that the detection algorithm expects originally.

Figure 6:
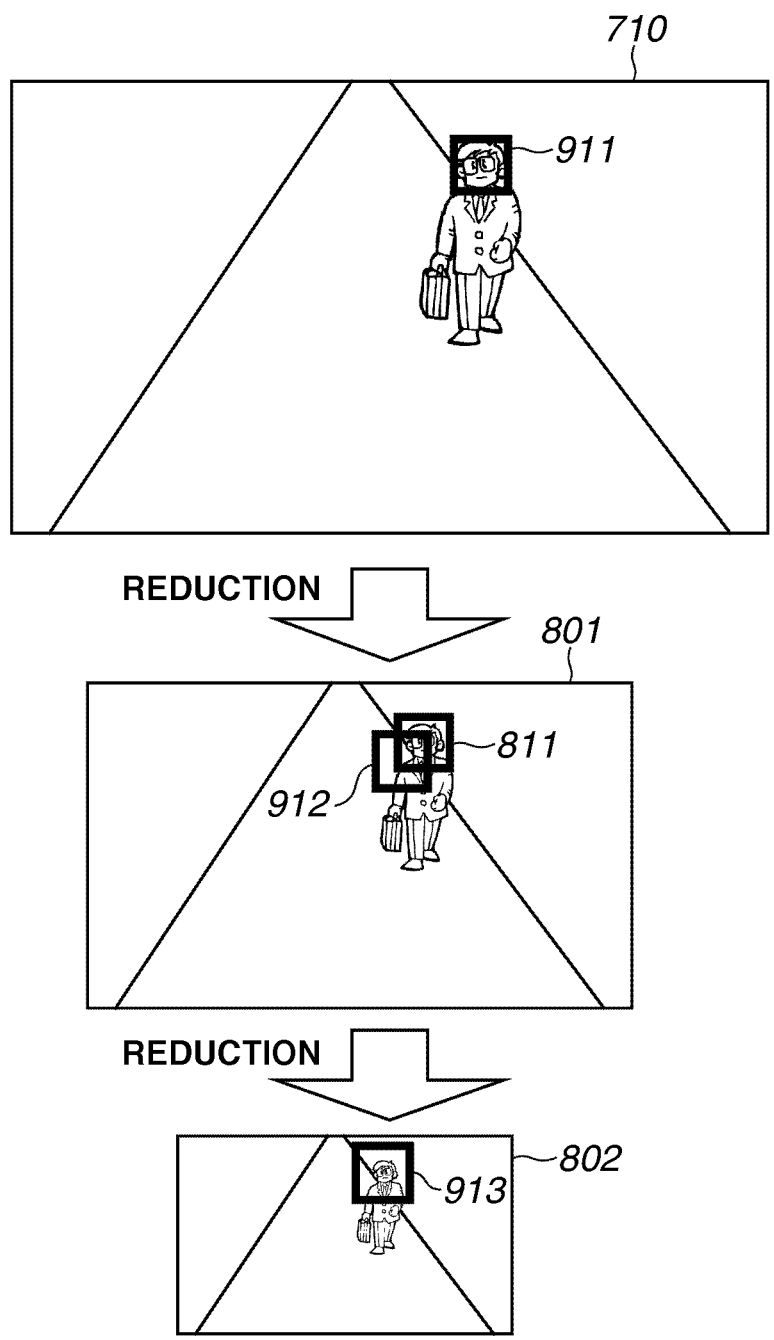
FIG. 6 illustrates that the detection algorithm returns a plurality of detection results for a single object.

On the other hand, a situation illustrated in FIG. 6 may occur. FIG. 6 illustrates that the detection algorithm returns a plurality of detection results for a single object. The image 710, the reduced images 801 and 802, and the detection window 811 are the same as those illustrated in FIG. 5. In the example illustrated in FIG. 5, the detection window 811 matches the object's face in the reduced image 801. However, actually, since the algorithm has the generalization property, the same object may be detected in another image at different resolution (windows 911 and 913), or the object may be detected at a slightly shifted position (window 912) in the image at the same resolution.

Figure 7:
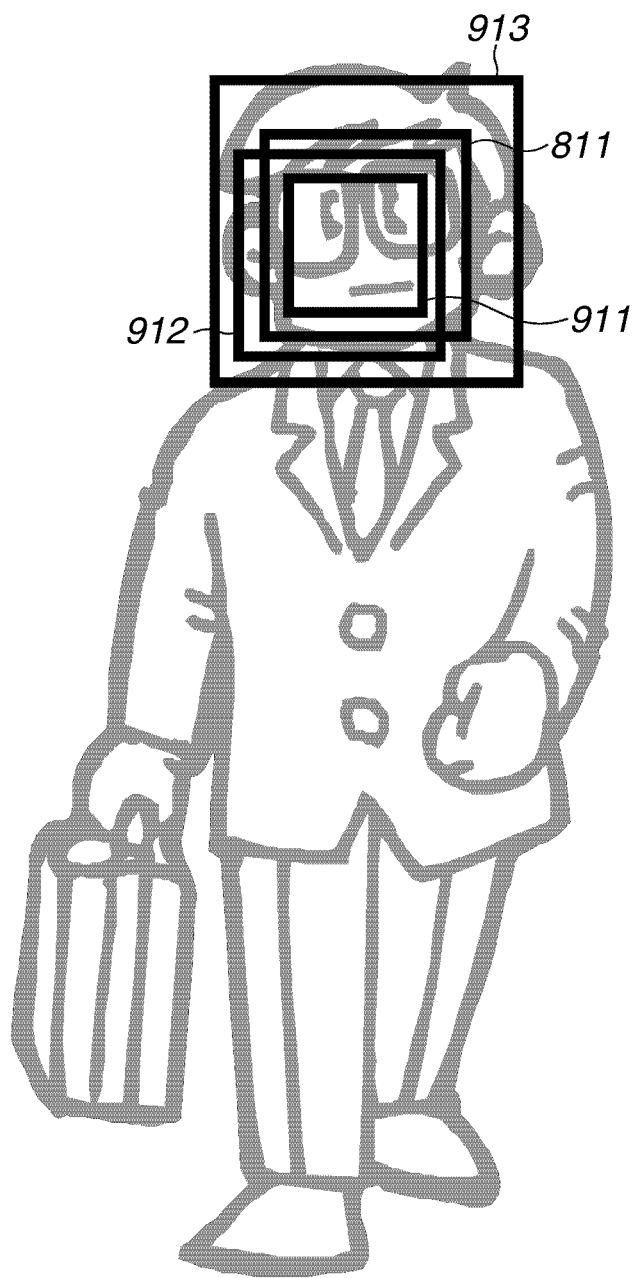
FIG. 7 illustrates a state in which a plurality of matching windows is associated with one another in consideration of magnification ratios of images.

FIG. 7 illustrates a state in which the plurality of matching windows are associated with one another in consideration of the magnification ratios of the images. The windows (regions) 811 and 911 to 913 correspond to the windows indicated by the same reference numerals in FIG. 6. However, actually, there is only one object, so that these regions 811 and 911 to 913 need to be integrated into one region. This processing is the integration processing by the integration processing unit 104.

The integration processing is processing for integrating the regions 811 and 911 to 913 illustrated in FIG. 7 into one region. The integration processing unit 104, for example, calculates the centers (the centroids) of the respective regions 811 and 911 to 913, and determines that they are regions detecting a same object if a difference among them is equal to or smaller than a threshold value to integrate them. The threshold value may be determined in advance. Further, the integration processing unit 104 integrates the regions by, for example, calculating averages of four vertexes of the rectangle among the respective regions. The integration processing method described herein is merely an example, and the integration processing method may be any method capable of generating one region from the regions 811 and 911 to 913 illustrated in FIG. 7.

For the integration processing, the detection unit 102 once stores a detection result from the detection processing applied to one image (hereinafter referred to as "intermediate result" to distinguish it from the result after the integration). Then, the integration processing unit 104 analyzes a relationship among the detection results (the distance among the centers of the intermediate results in the above-described example) to make a determination. Therefore, the intermediate results need to be temporarily stored. Accordingly, a storage area for storing the intermediate results will be prepared, and it is difficult to determine how large area to be prepared.

First, it is impossible to estimate how many intermediate results will be detected in a detected image before actually detection. Next, a theoretical upper limit value is considered. For example, suppose that the resolution of an input image (the image 710 illustrated in FIG. 5) is approximately Video Graphic Array (VGA) (640×480 pixels). Assuming that the window has a size of 20×20 pixels, and can be set to be shifted from the adjacent window by one pixel, and the image is vertically and horizontally reduced by $1/\sqrt{2}$ (the number of pixels is reduced by ½), the approximate number of windows can be calculated by the following equation.

$$\text{THE APPROXIMATE NUMBER OF WINDOWS} = \frac{(640-20) \times (480-20)}{1-\frac{1}{2}} \cong 570000$$

(from the sum of infinite series)
Actually, the image cannot be reduced infinitely, so that the actual number of the window is smaller than the above calculated number, but yet approximately 500000 or more windows will be processed.

If the resolution of an input image is Quarter Video Graphic Array (QVGA) (320×240 pixels), the number of windows acquired from the similar calculation is approximately 130000. Further, if the processing is thinned out and the windows are set so as to be shifted from the adjacent window by one pixel vertically and horizontally, the result will be a quarter of the prior case, so that approximately 30000 windows can be set. Alternatively, if the processing is further thinned out and the windows are set so as to be shifted from the adjacent window by three pixels vertically and horizontally, the result will be one-sixteenth, so that less than 10000 windows can be set. Therefore, if the processing is performed with a memory corresponding to the theoretical upper limit value prepared, for example, assuming that an area of 10 byte is required to store necessary information for one intermediate result, a memory of 100000 byte ≈100 KB is required to store approximately 10000 intermediate results.

However, when the detection processing was actually performed with approximately 10000 windows set to images (an input image and all of the reduced images thereof), the result was that many images output at most approximately 100 to 200 intermediate results. In other words, many images use only approximately 1 to 2 percent of the storage area prepared based on the theoretical upper limit value.

A memory of 100 KB may not become a big problem when the detection processing is realized in, for example, a personal computer. However, for example, when the detection processing is realized by software embedded in a device or a circuit, a memory of 100 KB is a large capacity as a memory (static random access memory (SRAM)) within an embedded device, and affects the price of the device. In addition, it is obvious that preparing a memory corresponding to the theoretical upper limit value is extremely redundant in consideration of the fact that, normally, only approximately 1 to 2 percent thereof is used. Therefore, it is desirable to realize the detection processing with use of a memory of an appropriate size (for example, a size capable of storing approximately 200 results according to the experiment). However, a shortage of the storage area may occur depending on the content of an image.

Figure 8:
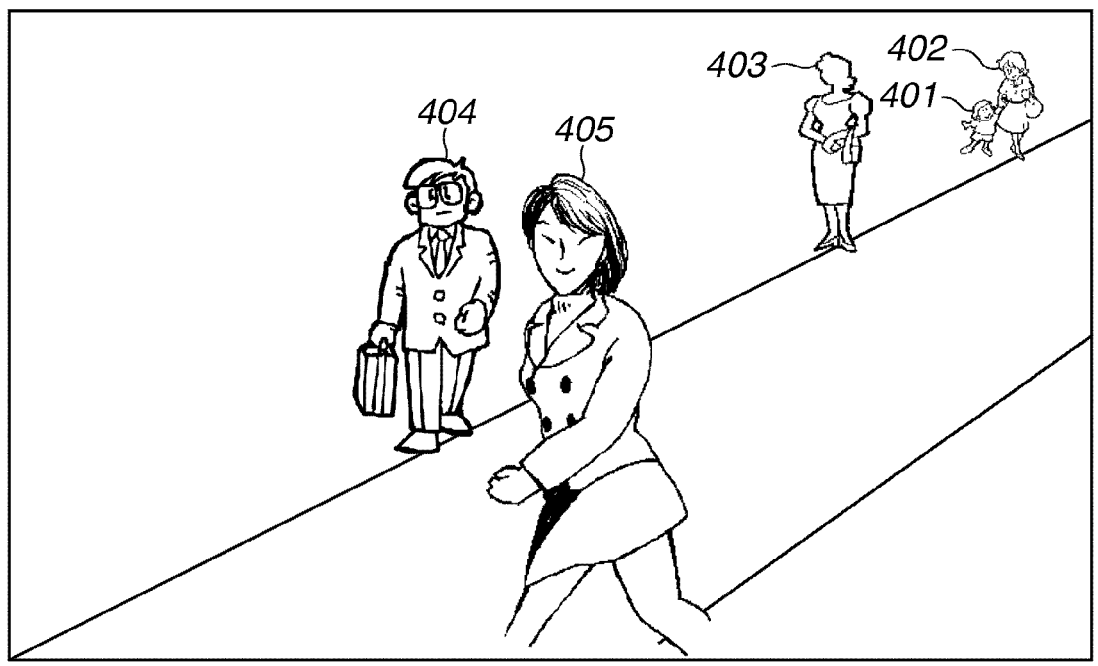
FIG. 8 illustrates an image containing faces having various sizes.
Figure 9:
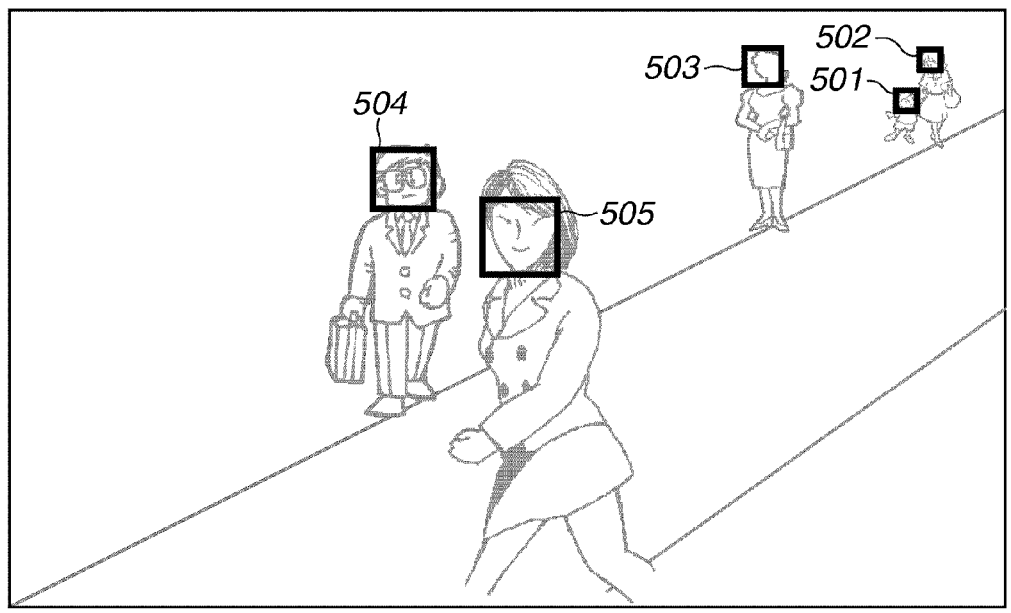
FIG. 9 illustrates an example of intermediate results of detection for the respective objects.

The shortage of the storage area can be solved in the following manner. FIG. 8 illustrates an image containing faces having various sizes. The image illustrated in FIG. 8 contains an object 401 (an object image in a small size) to an object 405 (an object image in a large size). On the other hands, FIG. 9 illustrates examples of intermediate results acquired from detection for the respective objects. Actually, intermediate results having different positions and sizes may be detected with respect to intermediate results 501 to 505 as described above, however such results are omitted in FIG. 9 for simplification of the description.

FIG. 10 illustrates processing applied to the image illustrated in FIG. 8. The elements in FIG. 10 same as those in FIGS. 8, 9, and 5 are indicated by the same reference numerals, and therefore descriptions thereof will be omitted here. First, the detection unit 102 performs the detection processing 820 on an input image 1101, and outputs, for example, intermediate results 501 and 502. Next, the detection unit 102 performs the detection processing 820 on a reduced image 1102, and outputs an intermediate result 503. Further, the detection unit 102 performs the detection processing 820 on a reduced image 1103, and outputs intermediate results 504 and 505.

Figure 11A:
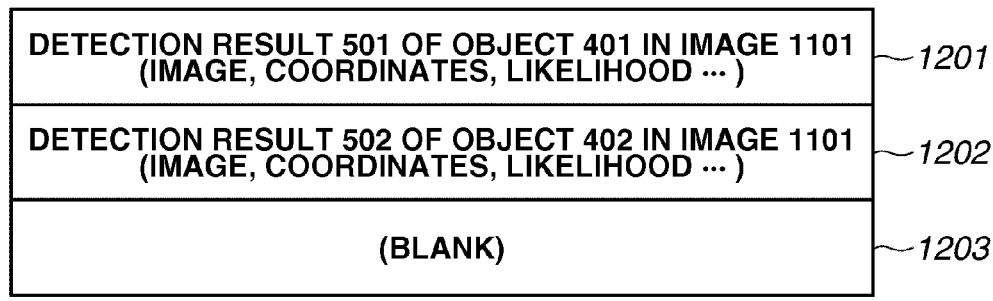
FIGS. 11A to 11C each illustrate a state of an intermediate result storage unit.
Figure 11B:
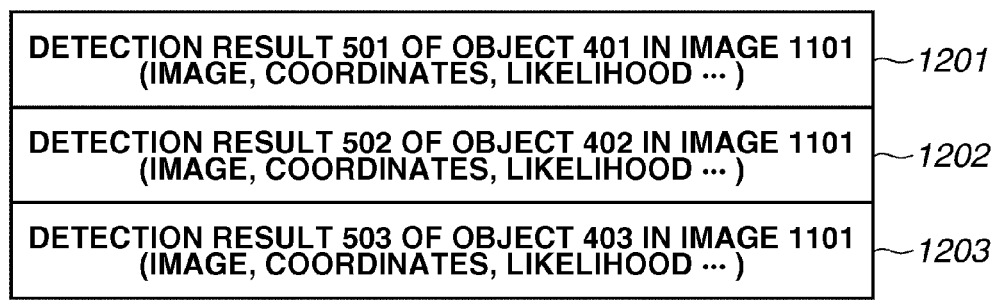
Figure 11C:
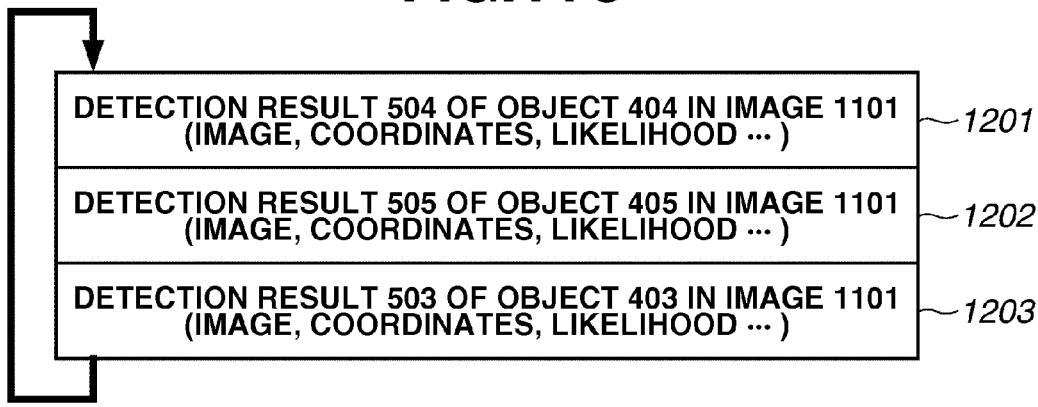

FIGS. 11A to 11C illustrate the state of the intermediate result storage unit 103. For simplification of description, the present exemplary embodiment is described assuming that the intermediate result storage unit 103 includes intermediate result storage areas 1201 to 1203 corresponding to 3 results. The case in which five results, namely the intermediate results 501 to 505 are output to the intermediate result storage areas is described as illustrated in FIG. 10.

Figure 12A:
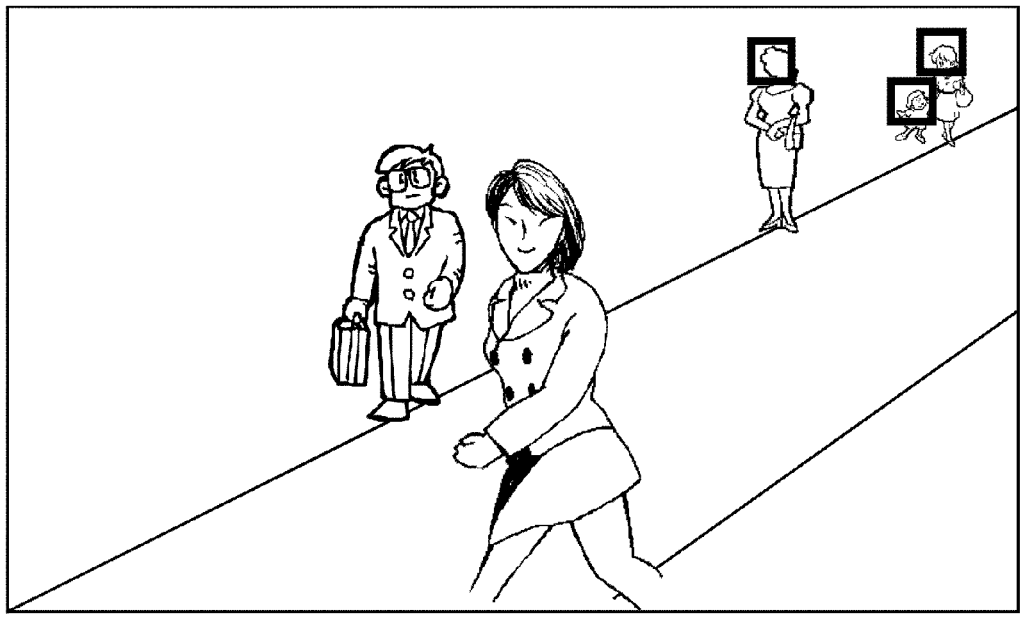
FIGS. 12A and 12B each illustrate an example of a detection result.

First, the intermediate results 501 and 502 are output from the input image 1101, and they are stored in the intermediate result storage areas 1201 and 1202, respectively (FIG. 11A). Subsequently, the detection result 503 is output from the reduced image 1102, and stored in the intermediate result storage area 1203. As a result, the intermediate result storage unit 103 is brought into a buffer full state (FIG. 11B). When the subsequent intermediate results 504 and 505 are output in the buffer full state, the simplest way to handle this case is to discard the intermediate results 504 and 505 without storing them into the intermediate result storage unit 103. FIG. 12A illustrates an example of the detection result in this case.

Referring to the results illustrated in FIG. 12A, this looks like as if it has failed to detect the central two people whose images are relatively large. Empirically, a larger object can be considered more important than a smaller object in a captured image. As viewed from a different perspective, it is considered that the faces of the central two people have higher resolution, and are relatively easy to be detected. Nevertheless, the result illustrated in FIG. 12A looks like as if it has failed to detect faces in the relatively large size. Therefore, this method provides an output as if it has failed to detect (empirically) important and supposedly easily detectable objects.

Instead, the processing method according to the present exemplary embodiment is performed as follows. In the processing method according to the present exemplary embodiment, the detection unit 102 circularly uses the intermediate result storage areas 1201 to 1203 of the intermediate result storage unit 103 and writes the results therein (regardless of whether data has been already stored in that area). FIG. 11C illustrates the state of the intermediate result storage unit 103 when the detection unit 102 uses the intermediate result storage area 1201 as the storage area next to the intermediate result storage area 1203 to store the intermediate result 504 therein, and similarly, stores the detection result 505 in the intermediate result storage area 1202. For example, if there are further intermediate results thereafter, the detection unit 102 circularly stores them into the intermediate result storage areas 1203 and 1201 in this order subsequently.

Figure 13:
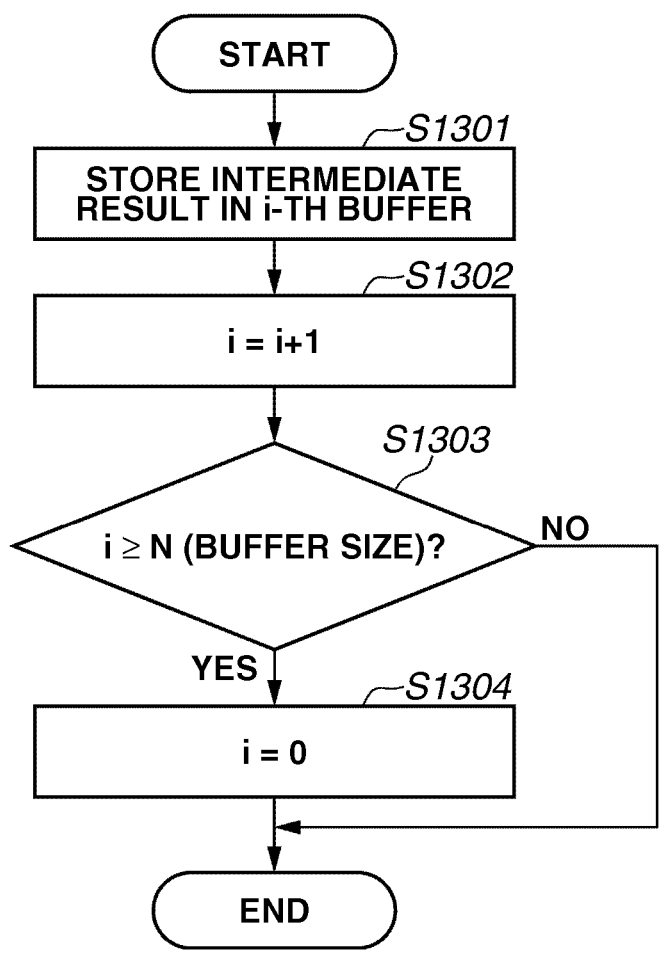
FIG. 13 is a flowchart illustrating processing for storing intermediate results by circularly using intermediate result storage areas according to the first exemplary embodiment.

FIG. 13 is a flowchart illustrating the processing for circularly using the intermediate result storage areas 1201 to 1203 to store the intermediate results therein according to the first exemplary embodiment. A variable "i" in the flowchart in FIG. 13 is initialized to zero by the processing other than that in FIG. 13 when the image processing apparatus is started up or an input image as a detection target is changed.

First, in step S1301, the detection unit 102 stores an output detection result (intermediate result) in an i-th buffer. In the example illustrated in FIGS. 11A to 11C, the intermediate result storage area 1201 is a 0-th buffer. The intermediate result storage area 1202 is a first buffer. The intermediate result storage area 1203 is a second buffer. The storage of the data contains information indicating the coordinates and likelihood of the rectangle the detection result. At this time, the coordinates of the rectangle may be the coordinates acquired by converting the rectangle of the corresponding detection result into data in the coordinate system of the input image 1101. Alternatively, the stored data can be configured to contain information indicating the coordinates in the coordinate system of the detected image and which image the result is output from ("IMAGE" in the intermediate result storage areas 1201 to 1203 illustrated in FIGS. 11A to 11C corresponds to the information for identifying the image). In the latter case, the integration processing unit 104 converts the coordinates in the detection result into data in the coordinate system of the input image 1101 when performing integration processing.

Subsequently, in step S1302, the detection unit 102 increments the variable i by one.

Then, in step S1303, the detection unit 102 compares the variable i and the buffer size N. If i is equal to or larger than N (YES in step S1303), the processing proceeds to step S1304. If not (NO in step S1303), the processing is ended. In step S1304, the detection unit 102 resets the value of the variable I to zero. This is because i≥N is satisfied when the detection processing reaches the final buffer, so that, in this case, setting the variable i to zero in step S1304 enables the intermediate result storage areas 1201 to 1203 of the intermediate result storage unit 103 to be circularly used.

Figure 12B:
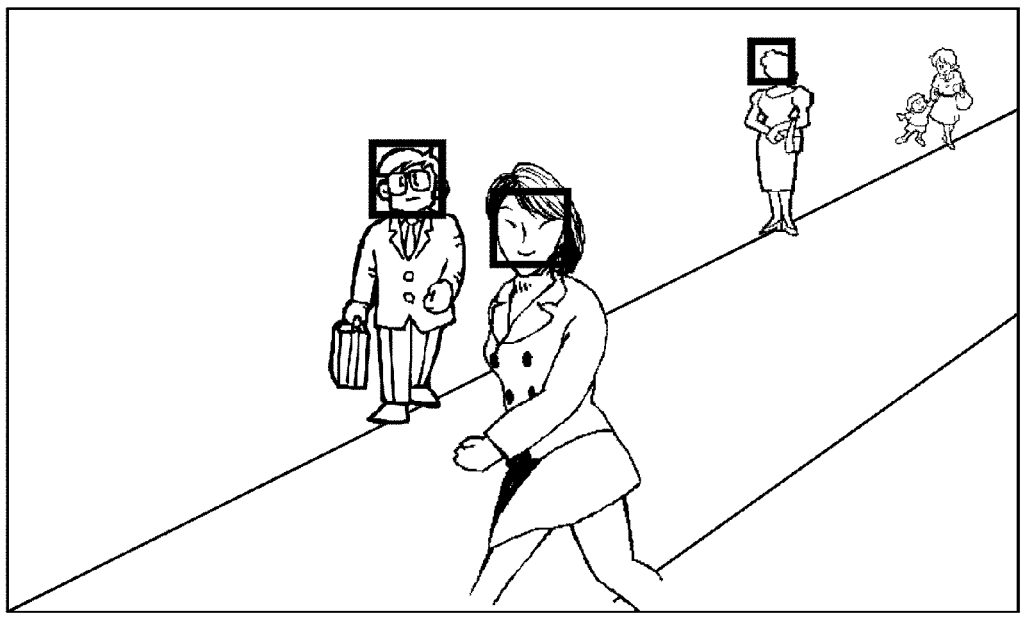

FIG. 12B illustrates an example of the detection result when the intermediate result storage unit 103 is in the state illustrated in FIG. 11C in the method according to the present exemplary embodiment. In FIG. 12B, the detection results are displayed on two people at the central position who are supposed to be relatively important, instead of losing the detection results corresponding to the upper right two people in a small size. Therefore, the comparison with the results in FIG. 12A reveals that the results in FIG. 12B are more appropriate. As described above, during the detection processing, the present exemplary embodiment causes an image at higher resolution to be processed first so that a smaller detection result is detected first. Then, the present exemplary embodiment circularly uses buffer areas for storing intermediate results, thereby allowing a larger detection result to be prioritized in a case where the number of output intermediate results exceeds the pre-prepared buffer areas. Accordingly, an excellent result can be acquired.

The configuration illustrated in FIG. 1 includes the image storage unit 101, the intermediate result storage unit 103, and the result storage unit 105 as separate storage areas. This is only because data stored therein is different. Therefore, any of them may be constituted by a single storage unit (for example, a memory, a resister, or a disk apparatus). Especially, a modification including the intermediate result storage unit 103 and the result storage unit 105 as a single storage unit may be effective in reducing the required number of memories.

Figure 14:
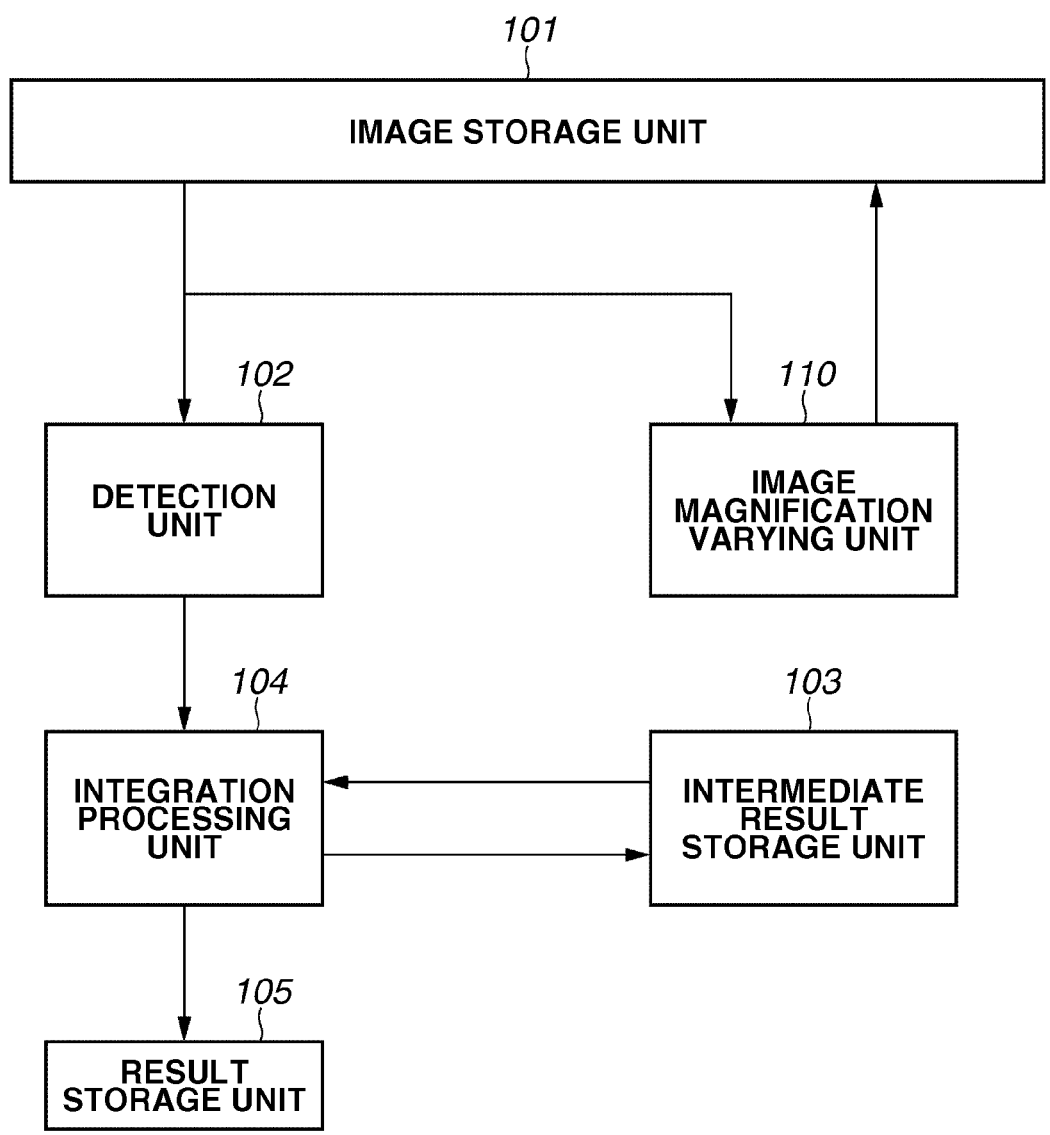
FIG. 14 illustrates an example of the hardware configuration of the image processing apparatus according to the first exemplary embodiment.

Further, the configuration illustrated in FIG. 1 can be modified in various manners. FIG. 14 illustrates an example of a hardware configuration of the image processing apparatus according to the first exemplary embodiment. The configuration illustrated in FIG. 14 is configured in such a manner that all of instructions and detection results (intermediate results) of the detection unit 102 are once transferred to the integration processing unit 104, and the integration processing unit 104 stores the detection results into the intermediate result storage unit 103. Such a modification is also within the scope of the present exemplary embodiment. In this case, the processing illustrated in FIG. 13 can be realized by being performed by the integration processing unit 104.

Further, as is the case with the configuration example illustrated in FIG. 1, in the configuration illustrated in FIG. 14, the intermediate result storage unit 103 and the result storage unit 105 may be constituted by a single storage unit.

Alternatively, the intermediate result storage unit 103 may be duplicated to allow the detection unit 102 and the integration processing unit 104 to operate in a pipeline manner. In this case, at the same time that the integration processing unit 104 performs the integration processing on the detection results (intermediate results) from the first image, the detection unit 102 can perform the detection processing on the second image.

Figure 15:
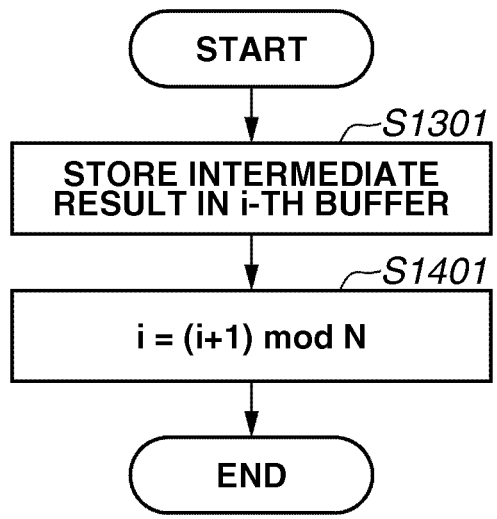
FIG. 15 is a flowchart illustrating processing for storing intermediate results by circularly using the intermediate result storage areas according to the first exemplary embodiment.

The processing according to the flowchart illustrated in FIG. 13 may be replaced with the processing according to the flowchart illustrated in FIG. 15. FIG. 15 is a (second) flowchart illustrating processing for storing intermediate results by circularly using the intermediate result storage areas 1201 to 1203 according to the first exemplary embodiment. The processing in step S1301 illustrated in FIG. 15 is the same as that in step S1301 in the flowchart illustrated in FIG. 13, however the detection unit 102 performs calculation in step S1401, instead of the processing in step S1302 and the steps thereafter. The equation in step S1401 includes "mod", which indicates the residue arithmetic. In addition, especially, if the value of N is a power of 2 and equal to or larger than 2, instead of the calculation in step S1401, the detection unit 102 may perform calculation by the following equation:

$$i = (i+1) \ \& \ (N-1) \ (\text{``\&'' represents bitwise AND})$$

The method using the equation including "mod" is effective when, for example, a performance reduction due to the conditional branching exceeds the cost required for the calculation of the residue arithmetic. Further, the method using bitwise AND can realize the processing with the bit AND which requires less cost for the calculation than the "mod" calculation, and therefore is effective when the specified condition (the value of N is a power of 2 and equal to or larger than 2) is satisfied.

As described above, the image processing apparatus according to the first exemplary embodiment circularly uses the buffer areas for storing intermediate results during the detection processing for detecting a target using fixed-sized window processing while reducing an image. As a result, it is possible to acquire an excellent result even when the number of output intermediate results exceeds the number of buffer areas.

Figure 16:
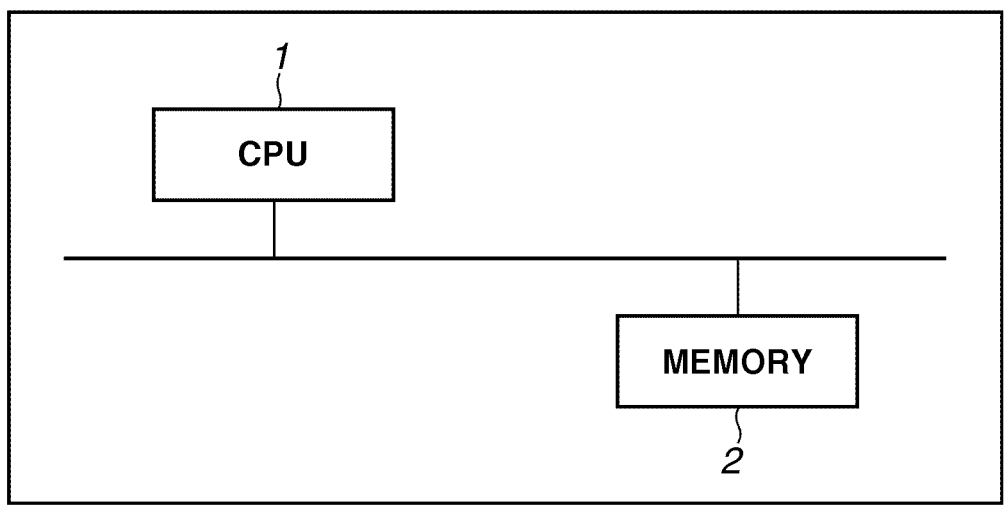
FIG. 16 illustrates an example of the hardware configuration of the image processing apparatus according to the first exemplary embodiment.

The present exemplary embodiment is described based on an example in which the respective units are implemented as hardware as illustrated in FIG. 1. However, as illustrated in FIG. 16, the respective units may be realized as software in such a manner that a central processing unit (CPU) 1 executes a program stored in a memory 2 to cause it to function as the respective units. In this case, a medium (for example, a memory) for storing the program is one exemplary embodiment according to the present exemplary embodiment. In the configuration illustrated in FIG. 16, the intermediate result storage unit 103, the result storage unit 105, and the image storage unit 101 are realized in the memory 2, however this configuration does not limit the present exemplary embodiment. As described above, the respective storage units may be constituted by respectively different storage media (for example, a memory, a resister, and a disk apparatus).

Next, a second exemplary embodiment will be described. Regarding the second exemplary embodiment, only a difference from the first exemplary embodiment will be described. FIG. 1 of the first exemplary embodiment illustrates an example including the image magnification varying unit 110, however, this is merely an example. The image processing apparatus according to the present exemplary embodiment, the detection unit 102 may be configured to process an image at high resolution first and processes an image at low resolution after that. Thus, for example, if magnified images at various degrees of resolution can be prepared in the image storage unit 101 in advance, the image magnification varying unit 110 may be omitted. For example, image data, which is coded according to, for example, the known Joint Photographic Experts Group (JPEG) 2000 standard coding method, can be decoded into images at various degrees of resolution. Therefore, the image processing apparatus may be configured in such a manner that an image is sequentially decoded by a decoding processing unit (or a decoding processing apparatus) so as to be gradually output as images from an image at high resolution to an image at low resolution, stored into the image storage unit 101, and then processed by the detection unit 102.

Figure 17:
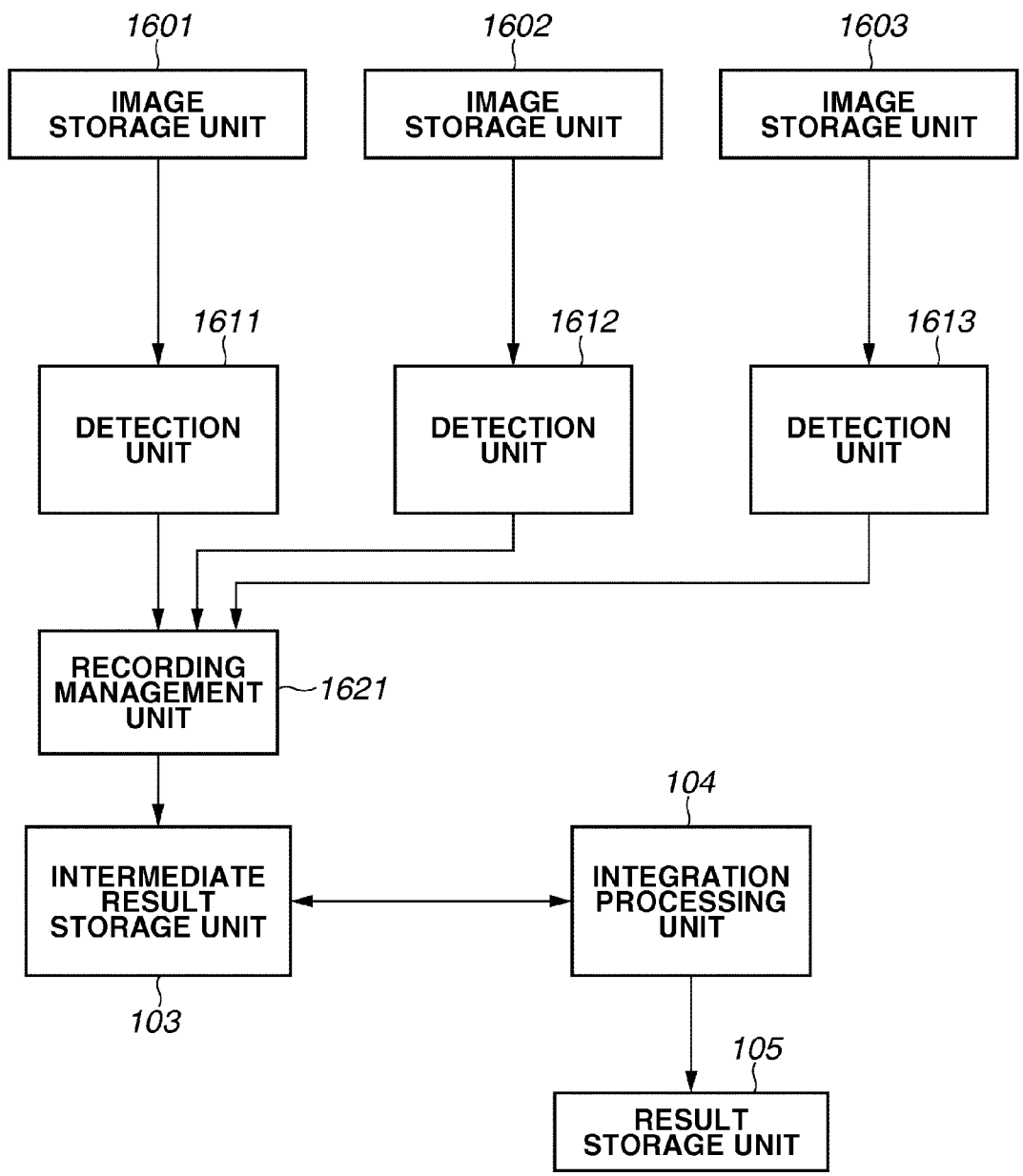
FIG. 17 illustrates an example of a hardware configuration of an image processing apparatus according to a third exemplary embodiment.

Next, a third exemplary embodiment will be described. Regarding the third exemplary embodiment, only a difference from the first exemplary embodiment will be described. FIG. 17 illustrates an example of the hardware configuration of an image processing apparatus according to the third exemplary embodiment. The configuration illustrated in FIG. 17 will be described by comparison with the configuration illustrated in FIG. 1. In FIG. 17, similar elements to those illustrated in FIG. 1 are indicated by the same reference numerals, and descriptions thereof will be omitted.

Referring to FIG. 17, image storage units 1601 to 1603 are configured in a similar manner to the image storage unit 101 illustrated in FIG. 1. However, the image storage units 1601 to 1603 store different images from one another. In other words, for example, the images 710, 801, and 802 illustrated in FIG. 5 are stored in the image storage units 1601, 1602, and 1603, respectively. It is noted that the image storage units 1601 to 1603 are illustrates as different blocks because they can be separated conceptually, and they may be embodied by a single storage medium physically (for example, a known memory, resister, and disk apparatus). The detection units 1611 to 1613 are configured in a similar manner to the detection unit 102 illustrated in FIG. 1. An only difference is that the detection units 1611 to 1613 receive input images from the image storage units 1601 to 1603, respectively. A recording management unit 1621 stores detection results (intermediate results) output from the detection units 1611 to 1613 into the intermediate result storage unit 103.

Figure 18:
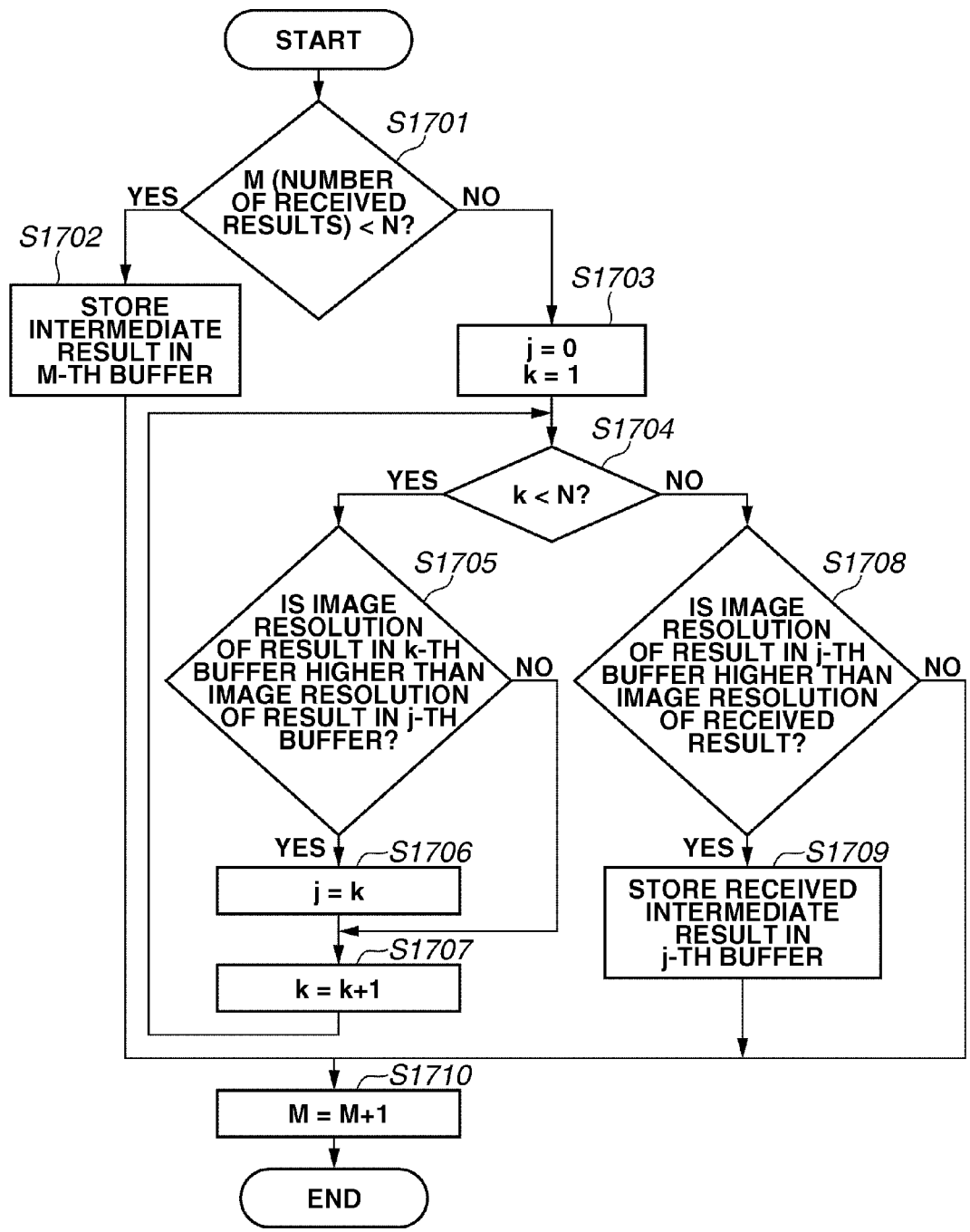
FIG. 18 is a flowchart illustrating processing for storing intermediate results in buffers.

A processing flow by the recording management unit 1621 at this time will be described with reference to FIG. 18. FIG. 18 is a flowchart illustrating processing performed when the recording management unit 1621 receives a detection result (intermediate result) from any of the detection units 1611 to 1613. A variable M in FIG. 18 represents the number of received intermediate results, and is initialized to zero by the processing other than that in this flowchart when the image processing apparatus is started up or an input image as a detection target is changed, as similar to the variable i in FIG. 13 according to the first exemplary embodiment.

First, in step S1701, the recording management unit 1621 compares the variable M and the variable N. The variable N represents the number of buffers in the intermediate result storage unit 103, as similar to the variable N in the flowchart in FIG. 13. The expression in step S1701 is true when the intermediate result storage unit 103 is not in a buffer full state, and in that case (YES in step S1701), the recording management unit 1621 advances the processing to step S1702. If the expression in step S1701 is false (NO in step S1701), the recording management unit 1621 advances the processing to step S1703.

In step S1702, the recording management unit 1621 stores the currently received intermediate result in an M-th buffer. Then, in step S1710, the recording management unit 1621 increments the value of the variable M by one. Then, the processing is ended.

On the other hand, if the determination in step S1701 is false (NO in step S1701), the recording management unit 1621 advances the processing to step S1703. In step S1703, variables to be used in the following steps are initialized. Thus, the recording management unit 1621 initializes a variable j to zero and a variable k to one.

The processing in step S1704 is for determining whether the loop constituted by subsequent steps S1705 to S1707 can be ended. If the variable k is equal to or larger than the variable N (NO in step S1704), the recording management unit 1621 ends the loop, and advances the processing to step S1708. If the variable k is smaller than N (YES in step S1704), the recording management unit 1621 advances the processing to step S1705 at the loop side.

In step S1705, the recording management unit 1621 compares the image resolution of the result stored in a k-th buffer and the image resolution of the result stored in a j-th buffer. In the present exemplary embodiment, the image resolution of the result can be determined by, for example, determining from which detection unit the intermediate result is received among the detection units 1611 to 1603. In addition, as illustrated in FIG. 11 of the first exemplary embodiment, the image resolution of the result is stored in the intermediate result storage areas 1201 to 1203. If "IMAGE" is contained in the information stored in the areas 1201 to 1203, the recording management unit 1621 can recognize the image resolution of the result from the information. Alternatively, the recording management unit 1621 can recognize the image resolution of the image by checking the size of a rectangle if the coordinates of the rectangle are expressed by the coordinate system after conversion into the coordinate system of the input image 1101. The larger rectangle indicates a detection result (intermediate result) of an image at lower resolution.

If the determination in step S1705 is true (YES in step S1705), the recording management unit 1621 advances the processing to step S1706. In step S1706, the recording management unit 1621 assigns the variable k to the variable j. On the other hand, if the determination in step S1705 is false (NO in step S1705), the recording management unit 1621 skips step S1706 to advance the processing to step S1707. In step S1707, the recording management unit 1621 increments the value of the variable k by one, and returns the processing to step S1704.

The loop processing from steps S1704 to S1707 is processing for searching for a detection result corresponding to an image at the highest resolution among the received intermediate results, and setting the variable j to a value indicating the location of that detection result in the buffer.

If the determination in step S1704 is false (NO in step S1704), and the loop processing in steps S1704 to S1707 is ended, the recording management unit 1621 advances the processing to step S1708.

In step S1708, the recording management unit 1621 compares the (highest) image resolution searched for in the previous loop with the image resolution of the currently received intermediate result. If the image resolution of the received intermediate result is lower than the (highest) image resolution in the buffer (YES in step S1708), the recording management unit 1621 advances the processing to step S1709.

In step S1709, the recording management unit 1621 overwrites the detected stored intermediate result with the received detection result, and then advances the processing to step S1710. If not (NO in step S1708), the recording management unit 1621 advances the processing to step S1710. In the latter case, the received intermediate result is discarded.

In other words, the recording management unit 1621 records the received intermediate result in an unoccupied space if the intermediate result storage unit 103 is not in the buffer full state. On the contrary, if the intermediate result storage unit 103 is in the buffer full state, the recording management unit 1621 searches for an intermediate result corresponding to an image at the highest resolution among the stored detection results. Then, the recording management unit 1621 compares the resolution of the image of the detected intermediate result with the resolution of the image of the received intermediate result, and stores the result of the image at lower resolution. The flowchart in FIG. 18 is an example of processing therefor, and a modification using processing that works similarly is included in the scope of the present exemplary embodiment.

The present exemplary embodiment is described based on an example in which the image storage units 1601 to 1603 store the images 710, 801, and 802 illustrated in FIG. 5, respectively, and the detection units 1611 to 1613 perform the detection processing on the images 710, 801, and 802, respectively. However, actually, the processing loads on the detection units 1611 to 1613 may be uneven because of the difference in the resolution of the images. In this case, for example, the image processing apparatus may be configured in such a manner that the images 710, 801, and 802 are appropriately divided to be distributed to the image storage units 1601 to 1613, and the detection units 1611 to 1613 perform the detection processing thereon, respectively.

Further, the image processing apparatus may be configured in such a manner that the identification information (or the information about the resolution) of images set as detection targets of intermediate results output from the detection units 1611 to 1613 is provided to the recording management unit 1621. It is desirable that the image processing apparatus is configured to include a control unit (not illustrated in FIG. 17) for controlling image division and distribution, and transmit the identification information of images from the control unit to the recording management unit 1621.

As described above, the first exemplary embodiment can be modified, for example, as illustrated in FIG. 14. Further, the present exemplary embodiment can be also modified in a similar manner. In this case, the image processing apparatus may be configured in such a manner that outputs from the plurality of detection units 1611 to 1613 are first received by the integration processing unit 104, and the recording management unit 1621 outputs the intermediate results to the intermediate result storage unit 103 in response to the outputs from the integration processing unit 104. Alternatively, the image processing apparatus may be configured in such a manner that the integration processing unit 104 carries out the function of the recording management unit 1621.

The present exemplary embodiment is described as an example in which the order relationship among the intermediate results output from the detection units 1611 to 1613 is different from the first exemplary embodiment. The method according to the present exemplary embodiment can provide an advantageous effect of facilitating parallelization of processing and distribution of processing by providing, for example, the plurality of detection units 1611 to 1613, compared to the first exemplary embodiment.

Next, a fourth exemplary embodiment will be described. Regarding the fourth exemplary embodiment, only a difference from the first and third exemplary embodiments will be described. The first and third exemplary embodiments are described based on an example in which the magnification ratio of an input image is changed. In the present exemplary embodiment, it is described a method for performing the detection processing while varying the magnification of the window size (in other words, performing the detection processing while changing the window size).

An image processing apparatus according to the present exemplary embodiment refers to a part or all of a window image during the detection processing, and performs determination processing thereon with use of a predetermined coefficient. The present exemplary embodiment sequentially doubles, triples, and so on, the window size and the reference position and range in the window, and thereby can acquire a similar effect when the magnification ratio of an input image is reduced to one-second, one-third, and so on. In this case, the image processing apparatus according to the present exemplary embodiment can perform the detection processing using, for example, the magnification ratio or size of the window, instead of the information about the resolution (or the identification information) of an image set as a detection target used in the first and third exemplary embodiments.

According to the first and third exemplary embodiments, the image processing apparatus is configured to discard a detection result of a detection target image at high resolution and save a detection result of a detection target image at lower resolution. This configuration is intended to save a detection result corresponding to a larger detection target as described above with reference to FIGS. 4 and 5. Accordingly, the image processing apparatus according to the present exemplary embodiment is configured to discard a detection result corresponding to a window with a smaller magnification ratio, and save a detection result corresponding to a window with a larger magnification ratio. To achieve this operation, the image processing apparatus according to the present exemplary embodiment records the magnification ratio (or information allowing identification of it), instead of the "IMAGE" information, when intermediate results are stored as illustrated in FIGS. 11A to 11C.

The image processing apparatus according to the present exemplary embodiment performs the detection processing on a whole area of an input image with a predetermined minimally-sized window, and then increases the window size to perform the detection processing again on the whole area of the input image. Then, the image processing apparatus according to the present exemplary embodiment further repeats the detection processing with a magnified-sized window. The image processing apparatus according to the present exemplary embodiment is configured in this way, and can be also realized by the processing illustrated in FIG. 13 or FIG. 15 of the first exemplary embodiment. As described above, according to the present exemplary embodiment, it is also possible to acquire an excellent result even when the number of output intermediate results exceeds the number of buffer areas.

Further, the present invention can be also implemented by performing the following processing. More specifically, software (a program) for realizing the functions of the above exemplary embodiments is supplied to a system or an apparatus via a network or various storage media, and a computer (or a CPU or a micro processing unit (MPU)) of the system or the apparatus reads and executes the program.

As described above, according to each of the exemplary embodiments, it is possible to realize object detection processing with use of a storage capacity of a smaller size than a fixed predetermined size.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-139687 filed Jun. 23, 2011, which is hereby incorporated by reference herein in its entirety.

What is claimed is:

1. An image processing apparatus comprising:
a processor; and
memory;
wherein the processor is configured to:
generate a plurality of images at different resolutions from an input image;
sequentially scan an input image and each of the plurality of images at the different resolutions, in descending order of the resolutions using a fixed-sized window to sequentially detect objects of different sizes in the input image in ascending order of the sizes of the objects;
store a plurality of detection results of the detection in a predetermined number of storage areas in a storage unit; and
write the sequentially detected objects in the predetermined number of storage areas circularly, such that if there is no free space in the predetermined number of storage areas to store a new detection result of a first object, the new detection result is overwritten on an old detection result of a second object which is smaller than the first object corresponding to the new detection result.

2. The image processing apparatus according to claim 1, wherein the processor is further configured to:
extract a plurality of detection results corresponding to an identical object from the storage unit based on respective positions corresponding to the plurality of extracted detection results; and
integrate the plurality of extracted detection results.

3. An image processing apparatus comprising:
a processor; and
memory;
wherein the processor is configured to:
sequentially scan an input image using windows having a plurality of sizes in ascending order of the sizes of the windows to sequentially detect objects of different sizes in the input image in ascending order of the sizes of the objects;
store a plurality of detection results in a predetermined number of storage areas in a storage unit; and
write the sequentially detected objects in the predetermined number of storage areas circularly, such that if there is no free space in the predetermined number of storage areas to store a new detection result of a first object, the new detection result is overwritten on an old detection result of a second object which is smaller than the first object corresponding to the new detection result.

4. The image processing apparatus according to claim 3, wherein the processor is further configured to
extract a plurality of detection results corresponding to an identical object from the storage unit based on respective positions corresponding to the plurality of extracted detection results; and
integrate the plurality of extracted detection results.

5. A method for processing an image, the method comprising:
sequentially scanning an input image and each of images at different resolutions, which are generated from the input image, in descending order of the resolutions by a fixed-sized window to sequentially detect objects of different sizes in the image in ascending order of the sizes of objects; and
writing the sequentially detected objects in the predetermined number of storage areas circularly, such that a new detection result is overwritten on an old detection result of a second object which is smaller than the first object corresponding to the new detection result, if there is no free space in a predetermined number of storage areas to store the new detection result of the detection.

6. A method for processing an image, the method comprising:
sequentially scanning an input image using windows having a plurality of sizes in ascending order of the sizes of the windows to sequentially detect objects of different sizes in the input image in ascending order of the sizes of the objects; and
writing the sequentially detected objects in the predetermined number of storage areas circularly, such that a new detection result is overwritten on an old detection result of a second object which is smaller than a first object corresponding to the new detection result, if there is no free space in a predetermined number of storage areas to store the new detection result of the first object.

7. A non-transitory computer-readable storage medium storing a program capable of causing a computer to execute a method according to claim 5.

8. A non-transitory computer-readable storage medium storing a program capable of causing a computer to execute a method according to claim 6.

* * * * *